United States Patent
Lubbers et al.

[19]

[11] Patent Number: 6,007,160
[45] Date of Patent: Dec. 28, 1999

[54] ELECTROHYDRAULIC BRAKE BOOSTER AND METHOD OF CONTROLLING SAME FOR SMOOTH BRAKE PEDAL FEEL

[75] Inventors: Mark D. Lubbers; Danny R. Milot; Richard J. Barron, all of Ann Arbor; Gregory J. Krawczyk, Livonia, all of Mich.

[73] Assignee: Kelsey-Hayes Company, Livonia, Mich.

[21] Appl. No.: 09/026,973

[22] Filed: Feb. 20, 1998

Related U.S. Application Data

[60] Provisional application No. 60/038,244, Feb. 21, 1997.

[51] Int. Cl.[6] .................................................. F16D 31/02
[52] U.S. Cl. ...................... 303/114.1; 303/3; 303/113.4; 188/358
[58] Field of Search .............................. 303/3, 15, 114.1, 303/113.4, 20, 155, 10–12, DIG. 3, DIG. 4; 188/358, 359; 60/545; 91/369.1, 376 R

[56] References Cited

U.S. PATENT DOCUMENTS

| | | |
|---|---|---|
| 4,311,085 | 1/1982 | Runkle . |
| 5,709,438 | 1/1998 | Isakson et al. .......................... 303/113.4 |
| 5,855,420 | 1/1999 | Lawrence ............................. 303/113.4 |

FOREIGN PATENT DOCUMENTS

WO 97/43154  11/1997  WIPO .
WO 97/43558  11/1997  WIPO .

OTHER PUBLICATIONS

Article entitled Hydraulics Offer Advantages in Power Brake Boosters by A. K. Brown, L. G. Bach, and D. J. Baker, published in "Society of Automotive Engineers", Paper No. 730536, May 14, 1973.

*Primary Examiner*—Douglas C. Butler
*Attorney, Agent, or Firm*—MacMillan, Sobanski & Todd, LLC

[57] ABSTRACT

A method of controlling the operation of an electrohydraulic brake booster to achieve a desired pedal feel. The method includes sensing brake pedal movement from a fully retracted rest position before a significant resistance to travel of the brake pedal is developed. The method further includes generating a command pulse that results in application of pressurized hydraulic fluid to the boost piston assembly sufficient to overcome preloaded spring forces and seal friction in the boost piston assembly that would otherwise tend to resist further brake pedal travel. The method further includes providing a control signal override when a brake pedal "bounce" condition is detected to avoid undesired vehicle braking. A brake pedal bounce condition may occur if the brake pedal is released suddenly so that the brake pedal returns to the fully retracted rest position rapidly enough to bounce off of a mechanical stop at that position and move in the brake apply direction.

10 Claims, 8 Drawing Sheets

ELECTROHYDRAULIC BRAKE BOOSTER AND METHOD OF CONTROLLING SAME FOR SMOOTH BRAKE PEDAL FEEL

CROSS REFERENCE TO RELATED APPLICATION

This application claims the benefit of U.S. Provisional application Ser. No. 60/038,244, filed Feb. 21, 1997, the disclosure of which is hereby incorporated by reference.

BACKGROUND OF THE INVENTION

This invention relates in general to brake systems for motor vehicles, and in particular to a method of controlling electrohydraulic boosters for vehicle brake systems.

Conventional vehicle brake systems are constructed such that the braking force developed by the system is generally proportional to the force applied by the vehicle operator on a vehicle brake pedal. The pedal is linked to a piston in a master cylinder that moves to pressurize the fluid of the brake system, and thus actuate the individual wheel brakes. Generally, in order to provide a sufficiently high pressure to operate the wheel brakes without requiring an excessive effort by the operator, most vehicles include a "boosted" power brake system wherein the force applied to the brake pedal by the operator is amplified or boosted before being applied to the master cylinder. In automobiles and light trucks, this is typically accomplished by incorporating either a vacuum or hydraulically operated boost piston assembly between the brake pedal and the master cylinder.

Vacuum operated boost piston assemblies utilize the pressure differences between the atmosphere and the vehicle's engine vacuum to develop a force across a boost piston or diaphragm. The force developed by this differential pressure across the boost piston may be many times that that could be developed by the operator by pressing against the pedal, and is applied to the piston of the master cylinder to actuate the brakes.

In brake systems with electrohydraulic brake boosters, hydraulic boost piston assemblies utilize the pressure developed by a hydraulic system, such as the vehicle's power steering system, to apply a force to a boost piston that is connected to operate a master cylinder of the brake system. Hydraulic boost piston assemblies of this type, and the associated brake boost pressure control systems, are described, for example, in International Patent Application Nos. PCT/US97/08151 and PCT/TJS97/07640, the disclosures of that are hereby incorporated by reference. The force applied to the piston of the brake system master cylinder via the boost piston of the hydraulic boost system, may be many times that that could be applied by the operator of the vehicle without a boost system. Electronic controls are provided that regulate the application of force by the boost piston according to pre-programmed instructions. Because of this electronic control of the hydraulic brake boosters, these brake boosters can easily be integrated into systems where the electronic control of the brake boost is used for traction control (TC), anti-lock braking (ABS), vehicle stability control (VSC), hill hold, theft protection, collision avoidance, panic brake assist, brake induced vehicular deceleration control, brake pedal travel control, and brake "pedal feel" characteristic tailoring. "Pedal feel" refers to the relationship between the force a driver applies to a brake pedal during vehicle braking and the resultant movement of the brake pedal.

SUMMARY OF THE INVENTION

This invention relates to a method of controlling the operation of an electrohydraulic brake booster to achieve a desired pedal feel. The method includes sensing brake pedal movement from a fully retracted rest position before a significant resistance to travel of the brake pedal is developed. The method further includes generating a command pulse that results in application of pressurized hydraulic fluid to the boost piston assembly sufficient to overcome preloaded spring forces and seal friction in the boost piston assembly that would otherwise tend to resist further brake pedal travel. The method further includes providing a control signal override when a brake pedal "bounce" condition is detected to avoid undesired vehicle braking. A brake pedal bounce condition may occur if the brake pedal is released suddenly so that the brake pedal returns to the fully retracted rest position rapidly enough to bounce off of a mechanical stop at that position and move in the brake apply direction.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
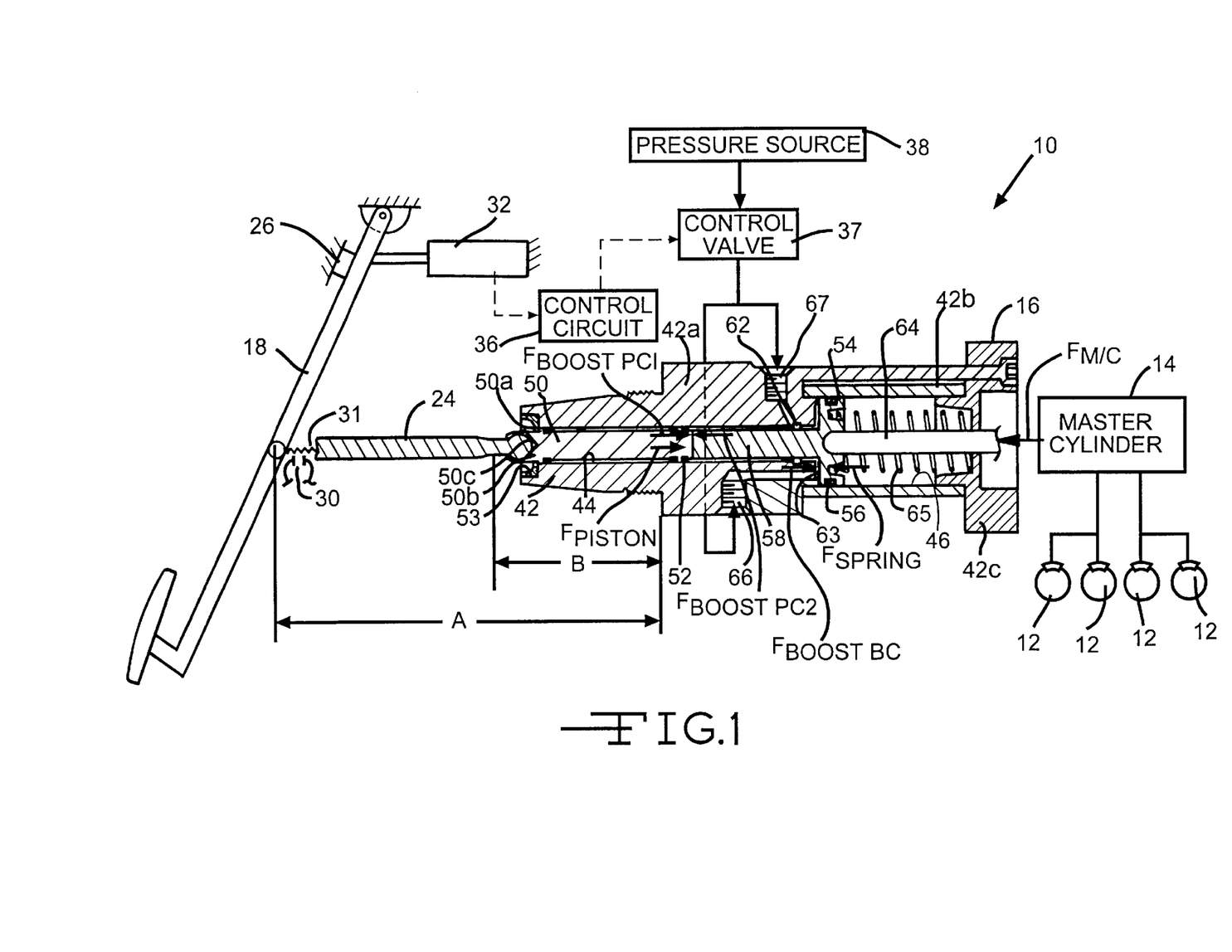
FIG. 1 is a schematic illustration of a vehicle brake system having an electrohydraulic brake booster that may be controlled according to the invention.

Referring now to the drawings, there is schematically shown in FIG. 1 a simplified vehicle brake system, indicated generally at 10. The brake system 10 includes a plurality of vehicle hydraulic brakes 12. The vehicle brakes 12 are actuated by pressurized hydraulic fluid supplied from a master cylinder 14. The master cylinder 14 is selectively actuated by a hydraulic boost piston assembly 16, which will be described in further detail below. The brake system 10 further includes a brake pedal 18 that is selectively depressed by the driver of the vehicle to actuate the brake system 10. The brake pedal 18 is connected to the boost piston assembly 16 by an arm 24. The brake pedal 18 is urged against a mechanical stop 26 by springs in the hydraulic boost piston assembly 16, as will be described below. When the brake pedal 18 is contacting the mechanical stop 26, the brake pedal 18 is in a fully retracted rest position. Note that while the mechanical stop 26 is schematically shown as a separate stop, the mechanical limitations on movement of the pistons of the hydraulic boost piston assembly 16, acting through the arm 24, may actually be the physical stop limitation on the movement of the brake pedal 18. The driver can selectively apply a force to the brake pedal 18 by stepping on the brake pedal 18 to move the brake pedal 18 to a desired brake apply position.

A brake switch 30 is provided that acts in a conventional manner to illuminate the brake lights (not shown) when the brake pedal 18 is moved from the fully retracted position to a brake apply position. The brake switch 30 includes a conventional brake switch spring 31 which acts to keep the electrical contacts of the brake switch 30 apart unless the brake pedal is depressed at least a certain distance from the fully retracted position. The brake switch spring 31 provides a lost motion connection between the brake pedal 18 and the arm 24. As used in this application, the term "lost motion" applied to a connection between selected components means that, within a small range of motion of one component, there is no corresponding movement of the other component. Initially, when the driver is first depressing the brake pedal 18, as the brake pedal switch spring 31 is being compressed, there is no corresponding movement of the arm 24. After a certain amount of movement of the brake pedal 18 in the apply direction, the brake pedal 18 begins to move the arm 24. The importance of this lost motion between the brake pedal 18 and the arm 24 will be explained below.

A pedal position sensor 32 is provided that generates a signal indicative of the relative displacement of the brake pedal 18 from the fully retracted position. Although the pedal position sensor 32 is shown as directly measuring the movement of the brake pedal 18, the pedal position sensor 32 may suitably be connected to a component that moves with the brake pedal 18, such as the arm 24. The pedal position sensor 32 may be any suitable displacement sensor, such as a rheostat or an LVDT (Linear Variable Displacement Transducer). The pedal position sensor 32 is capable of generating a signal for the entire range of movement of the brake pedal 18, including the lost motion region between the fully retracted position and the point at which the arm 24 begins to move during brake apply.

The signal from the pedal position sensor 32 is supplied to an electronic controller 36. As will be described in detail below, the electronic controller 36 controls the demand signal to a pressure control valve 37. The electronic controller 36 controls the demand signal to the pressure control valve 37 in response to the signal generated by the pedal position sensor 32. Of course, as will be apparent to those of ordinary skill in the art, other signals may suitably be supplied to the electronic controller 36 for the purposes of traction control (TC), anti-lock braking (ABS), vehicle stability control (VSC), hill hold, theft protection, collision avoidance, panic brake assist, brake induced vehicular deceleration control, and brake pedal travel control. The electronic controller 36 may modify the demand signal to the pressure control valve 37 based on these signals.

The pressure control valve 37 regulates the pressure of a fluid provided under pressure from a pressure source 38. The pressure source 38 may be, for example, the vehicle's power steering pump in combination with a pressure building valve, or other source of pressurized hydraulic fluid. Thus, the pressure supplied to the brake booster is from the associated pressure control valve 37.

The hydraulic boost piston assembly 16 has a tubular body 42. As shown in FIG. 1, the body 42 is preferably formed of several component parts, including an input body 42*a* defining a small diameter bore 44, a tubular intermediate body 42*b* defining a large diameter bore 46, and an end cap 42*c* which is bolted to the input body 42*a* by a plurality of fasteners, with the intermediate body 42*b* being captured between the input body and the end cap 42*c*. A cylindrical input piston 50 is fitted within the tubular body 42 to be reciprocable within the small diameter bore 44. The input piston 50 is sealed against the surface of the small diameter bore 44 by a seal 52. The input piston 50 has a stepped outer diameter, with a shoulder 50*a* being formed between a large diameter portion of the input piston 50 and a smaller diameter portion 50*b*. The small diameter portion 50*b* has a recess 50*c* formed in the axial end face thereof, which receives a ball-shaped end of the arm 24. The small diameter portion 50*b* of the input piston 50 is coupled to the arm 24 by any suitable conventional means. In the illustrated embodiment, the walls of the recess 50*c* are crimped about the ball-shaped end of the arm 24. The input piston 50 is thus coupled to the brake pedal 18 via the arm 24. The input piston 50 is retained in the small diameter bore 44 against movement in the direction of the arm 24 by an annular insert 53. The insert 53 is preferably threaded into a recess in the body 42, about the opening into the small diameter bore 44. An interference between the insert 53 and the shoulder 50*a* of the input piston 50 prevents the input piston 50 from moving completely out of the small diameter bore 44 in the direction of the arm 24. As explained above, the insert 53 may act as the mechanical stop 26 that limits movement of the brake pedal 18 at the fully retracted position of the brake pedal.

The hydraulic boost piston assembly 16 also has a boost piston 54 that is reciprocable within both the large diameter bore 46, and the small diameter bore 44. The boost piston 54 is sealed against the surface of the large diameter bore 46 by a seal 56. The boost piston 54 has a reduced diameter portion 58 that extends into the small diameter bore 44. A pedal chamber 62 is defined within the small diameter bore 44. A boost chamber 63 is defined within the large diameter bore 46. The pedal chamber 62 and the boost chamber 63 are in fluid communication with each other. The pedal chamber 62 extends from the boost chamber 63 to the seal 52 in the small diameter bore 44. The boost chamber 63 extends between the pedal chamber 62 and the seal 56 in the large diameter bore 46. The boost piston 54 is coupled to an actuating piston (not shown) in the master cylinder 14 by a rod 64. The boost piston 54 is biased away from the master cylinder 14 by a spring 65. Note that the spring 65, acting through the boost piston 54, the input piston 50, the arm 24, and the brake switch spring 31, urges the brake pedal 18 toward the fully retracted position thereof. Additionally, the master cylinder 14 also has springs (not shown) which act through the rod 64, the boost piston 54, the input piston 50, the arm 24, and the brake switch spring 31, to similarly urge the brake pedal 18 toward the fully retracted position thereof.

The boost pressure from the pressure source 38 is selectively admitted via the pressure control valve 37 to the interior of the body 42 of the hydraulic boost piston assembly 16 via a first port 66 that is always in communication with the boost chamber 63. The boost pressure from the pressure control valve 37 is simultaneously admitted to a second port 67 that is always in communication with the pedal chamber 62. Suitably, one of the port 67 and the port 66 can be eliminated, since the pedal chamber 62 communicates directly with the boost chamber 63 within the body 42, provided sufficient flow area remains to achieve desired flow rates of hydraulic fluid into and out of the interior of the body 42.

A force balance equation can be developed for the boost piston 54 (neglecting any frictional forces) as follows:

$$F_{piston} + F_{boost\ BC} + F_{boostPC1} = F_{M/C} + F_{springs}$$

where $F_{piston}$=the force of the input piston 50 acting directly on the boost piston 54 (this force is zero when the pistons 50 and 54 separate from one another)

$F_{boost\ BC}$=the boost pressure in the boost chamber 63 multiplied by the annular area of the boost piston 54 inside the boost chamber 63

$F_{boost\ PC1}$=the boost pressure in the pedal chamber 62 multiplied by the transverse cross sectional area of the reduced diameter portion 58 of the boost piston 54 inside the pedal chamber 62

$F_{M/C}$=the pressure in the master cylinder 14 multiplied by the area of the master cylinder piston (not shown)

$F_{springs}$=the force exerted by the boost piston spring 32 and other return springs (not shown), such as the master cylinder piston return springs The force balance equation on the input piston 50 is:

$$F_{pedal} = F_{piston} + F_{boost\ PC2}$$

where $F_{pedal}$=the force exerted by the arm 24 that is in direct relationship with the force exerted by the operator through the pedal 18 and linkage $F_{boost\ PC2}$=the boost pressure in the pedal chamber 62 multiplied by the cross sectional area of the input piston 50 inside the pedal chamber 62.

In the hydraulic boost piston assembly 16, an increase in boost pressure will increase the boost forces, $F_{boost\ BC}$ and $F_{boost\ PC1}$, acting on the boost piston 54. The force acting on the master cylinder 14 is the total of the boost forces acting on the boost piston 54 minus the return spring forces $F_{springs}$. The pressure built in the pedal chamber 62 acts to separate the pistons 50 and 54. When $F_{boost\ PC2}$ matches $F_{pedal}$, and boost pressure continues to increase, the pistons 50 and 54 separate. As the brake boost pressure increases, the pedal 18 will become harder to depress due to increasing pressure in the pedal chamber 62. The configuration of hydraulic boost piston assembly 16, because of its design, allows for the control of pedal travel versus pedal force (the pedal feel) by controlling the boost pressure applied to the pedal chamber 62 and the boost chamber 63.

Figure 2:
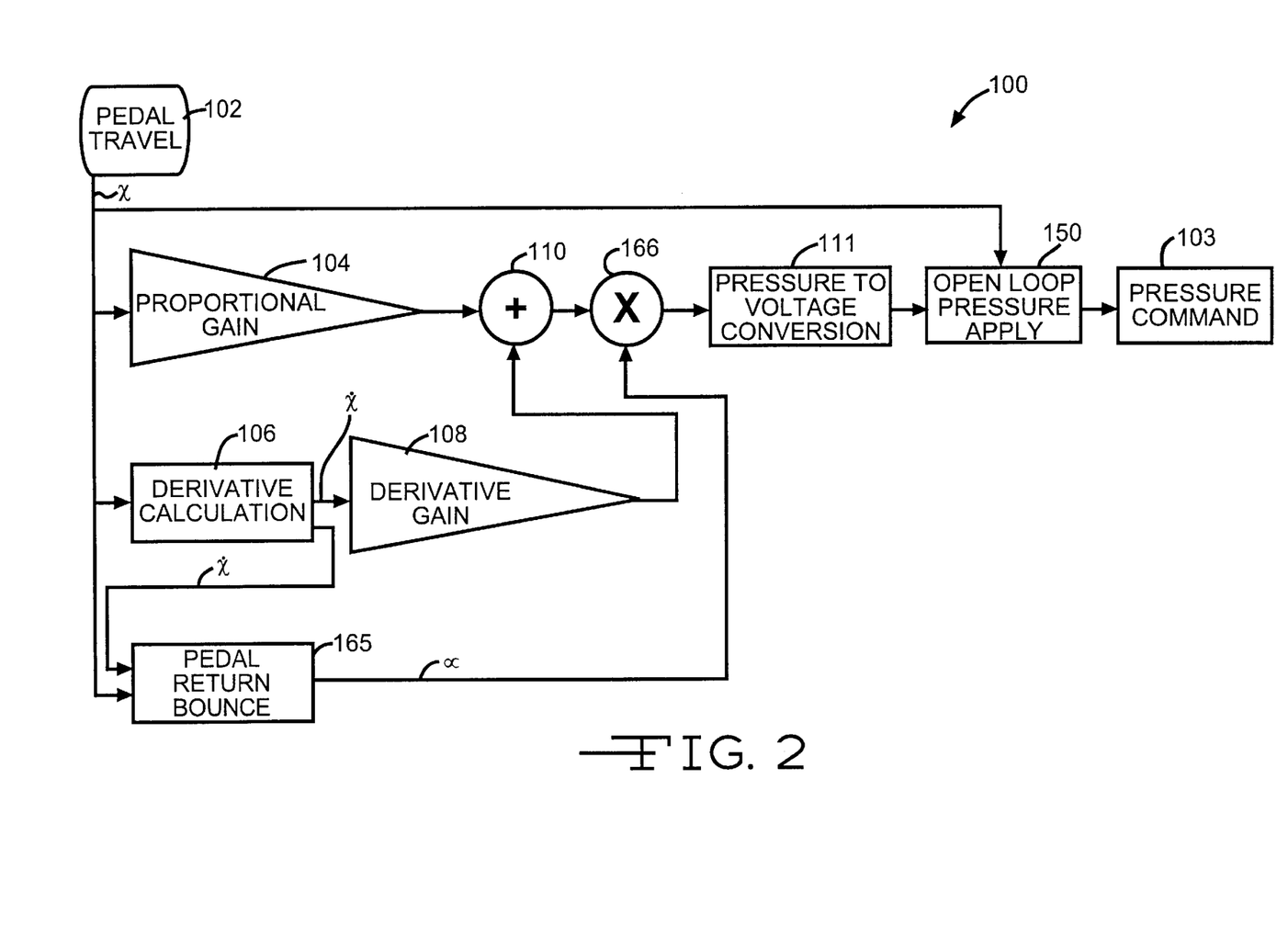
FIG. 2 is a simplified diagram of a software algorithm according to the present invention.

Referring now to FIG. 2, there is shown a simplified diagram of a software algorithm indicated generally at 100, according to the present invention. As shown in FIG. 2, the single input to the algorithm 100 is a pedal travel signal 102, which is generated by the pedal position sensor 32. The single output of the algorithm 100 is a pressure command signal 103, which is used to control the position of the control valve 37. The pedal travel signal 102 developed by the pedal position sensor 32 may be any suitable form of electronic signal. For example, in the preferred embodiment of the invention, the pedal travel signal 102 is a voltage signal that is realized through the use of external electronics. The pedal travel signal 102 is preferably converted in a pedal travel calibration step (not shown) from a raw measured voltage signal into a usable signal representative of engineering units. In the preferred embodiment, the signal 102 is subjected to a gain that converts the units of the signal from volts to millimeters. Thus, the pedal travel signal 102 after conversion will be a signal representative of the travel of the brake pedal 18 in millimeters. The pedal travel signal 102 is also subjected to an offset to define the zero location for the voltage signal. The offset constant can be calibrated such that the zero position (zero voltage signal) occurs at any point in the actual pedal travel. In the preferred embodiment described herein, the zero position will be assumed to be at the point that the brake pedal 18 starts to move the arm 24 when the brake pedal 18 is depressed. Thus, a negative pedal travel signal 102 is developed as the brake pedal 18 is retracted from the zero position, which pedal travel signal 102 increases in magnitude to a maximum negative value when the brake pedal 18 is in the fully retracted position. A positive pedal travel signal 102 is developed as the brake pedal 18 is depressed beyond the zero point and the arm 24 moves rightwardly (as viewed in FIG. 1), with the magnitude of the pedal signal 102 increasing as the brake pedal is depressed more fully. The pedal travel signal 102 as shown in FIG. 2 has already been subjected to unit conversion and properly offset, as described above.

The pedal travel signal 102 is applied to a proportional gain function 104. The proportional gain function defines the steady-state map from pedal travel to boost pressure. The proportional control consists of a gain scheduling function based on the pedal travel signal 102. The gain scheduling function converts the pedal travel signal 102 to a commanded boost pressure. The pressure command calculated by the proportional control function is denoted as $P_{Kp}$. It will be understood that the proportional control function defines the basic steady-state pedal feel. For a given pedal travel input, a given boost pressure will be commanded. This boost pressure will generate a pedal force feedback to the driver, and hence generate a certain pedal feel. The proportional control function can be calibrated to generate different steady-state pedal forces.

The proportional control function uses the pedal position, denoted as $\chi$ (supplied as the pedal travel signal 102), to define the proportional pressure command $P_{Kp}$. In one suitable embodiment, $P_{Kp}$ is defined as a function of $\chi$ in the following manner:

$$P_{Kp} = K_{boost}\chi$$

where $K_{boost}$, the proportional gain factor, is a gain factor which is empirically determined based on desired magnitude of boost pressure for a given position of the brake pedal 18. Note that this defines $P_{Kp}$ as a linear function of the position of the brake pedal 18. Frequently, a different mapping of steady-state pedal position to boost pressure may be desired. It will be appreciated that any suitable function of pedal position $\chi$ may be used to develop $P_{Kp}$. For example, the proportional gain factor $K_{boost}$ could be multiplied by $\chi^2$, or by a suitable quadratic function of $\chi$ to achieve a desired mapping of steady-state pedal position to boost pressure.

The pedal travel signal 102 is also applied to a derivative control function consisting of a derivative calculation function 106 and a derivative gain function 108. The derivative control function supplies a damping component to the control circuit 36. The derivative control function only aids to control transient effects. The steady-state contribution to the boost pressure versus pedal travel map is zero. The necessity for the derivative control function arises when one begins to look at the vehicle brake system 10 (FIG. 1). The hydraulic plant of the vehicle brake system 10 consists of the hydraulic pressure control valve 37 and the driver within the control circuit 36. The derivative control function is used to stabilize the effect that transient changes in boost pressure have on the forces acting on the brake pedal 18, and thus feed back to the position of the brake pedal 18. The derivative control function thus enhances the stability of this closed loop response and provides for transient response control.

In the derivative calculation function 106, a derivative signal, designated as $\dot{\chi}$, is calculated according to one of several methods well known in the art. $\dot{\chi}$ is the rate of change in the position of the brake pedal 18, i.e., the speed of movement of the brake pedal. Next, in the derivative gain function 108, the calculated derivative signal $\dot{\chi}$ is multiplied by a derivative gain factor $K_d$. As with the proportional gain factor $K_{boost}$, the derivative gain factor $K_d$ is a trimmable constant that can be derived for optimal performance. The product of the gain function 108 is a derivative boost pressure command $P_{Kd}$. The derivative boost pressure command $P_{Kd}$ is added to the proportional pressure command $P_{Kp}$ in a summing function 110 to produce a composite pressure command.

The composite pressure command is converted to a voltage signal in a boost pressure to control voltage conversion function 111. The conversion function 111 performs the task of converting the commanded boost pressure (the composite pressure command) to a control voltage that will be used as the actuating signal for the pressure control valve 37. Any of several methods well known in the art may be utilized by the conversion function 111 to convert the commanded boost pressure to a realizable actuating signal for the pressure control valve 37. In the preferred embodiment of the brake system 10, the pressure control valve 37 has non-linear control characteristics, and is commanded by a controlled voltage signal through the electronics of the control circuit 36. The controlled voltage signal is developed in the conversion function 111 of the algorithm 100. The mapping from boost pressure to volts is the inverse of the steady-state map of the commanded volts to boost pressure curve. In general, if a linear mapping is assumed, the resulting controlled pressure begins to deviate from the desired linear map as the commanded pressure becomes large. In order to keep a linear mapping between commanded pressure and actual boost pressure, a nonlinear inverse function is used to compensate for the non-linearity in the response. Of course, the conversion function 111 can be suitably changed to achieve the appropriate matching of the controlled voltage signal output from the conversion function 111 to the particular control characteristics of the pressure control valve 37.

Figure 3:
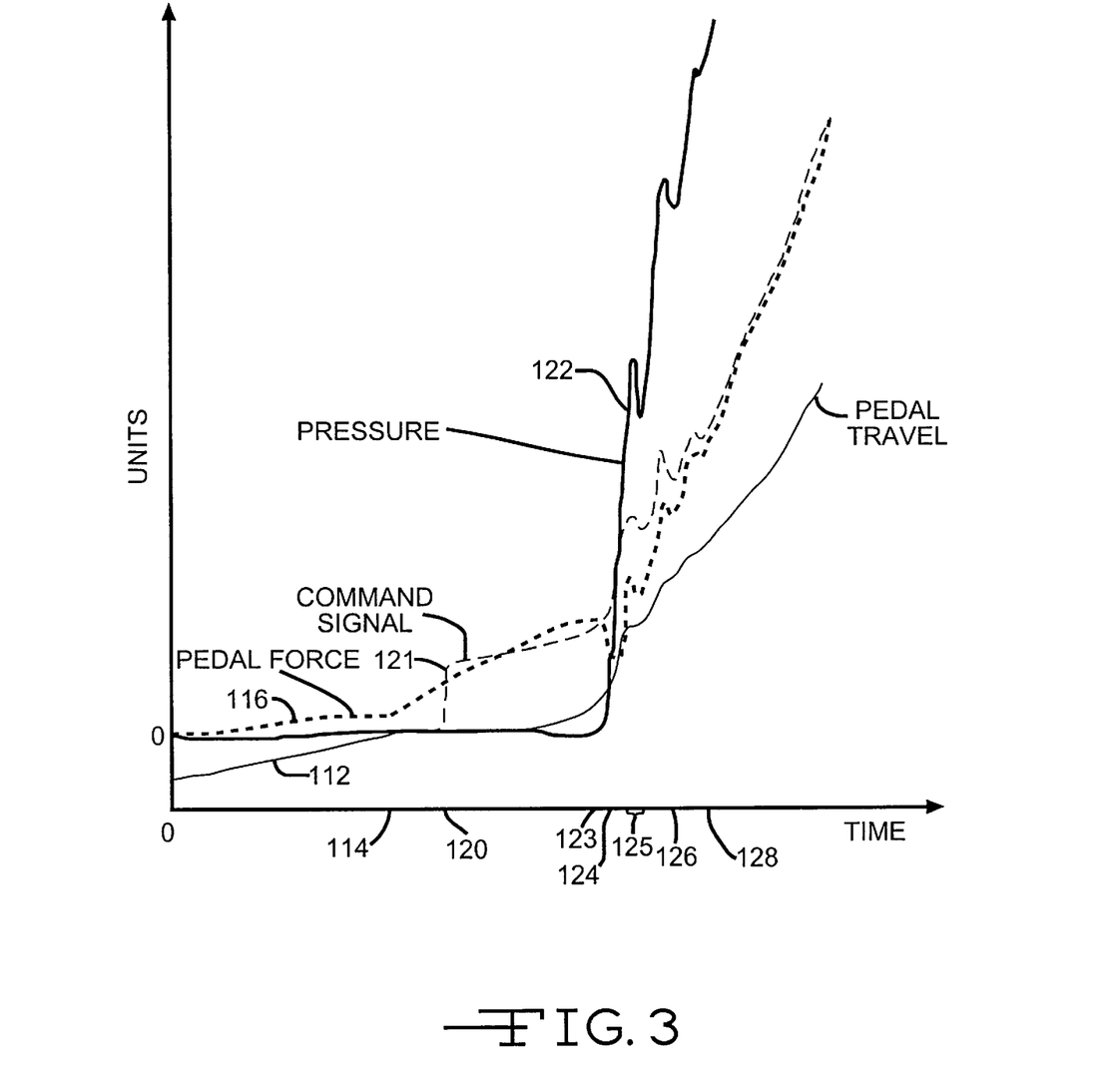
FIG. 3 is a graph of the response over time of various parameters of the brake system when the electrohydraulic booster is controlled without the features of the invention.
Figure 4:
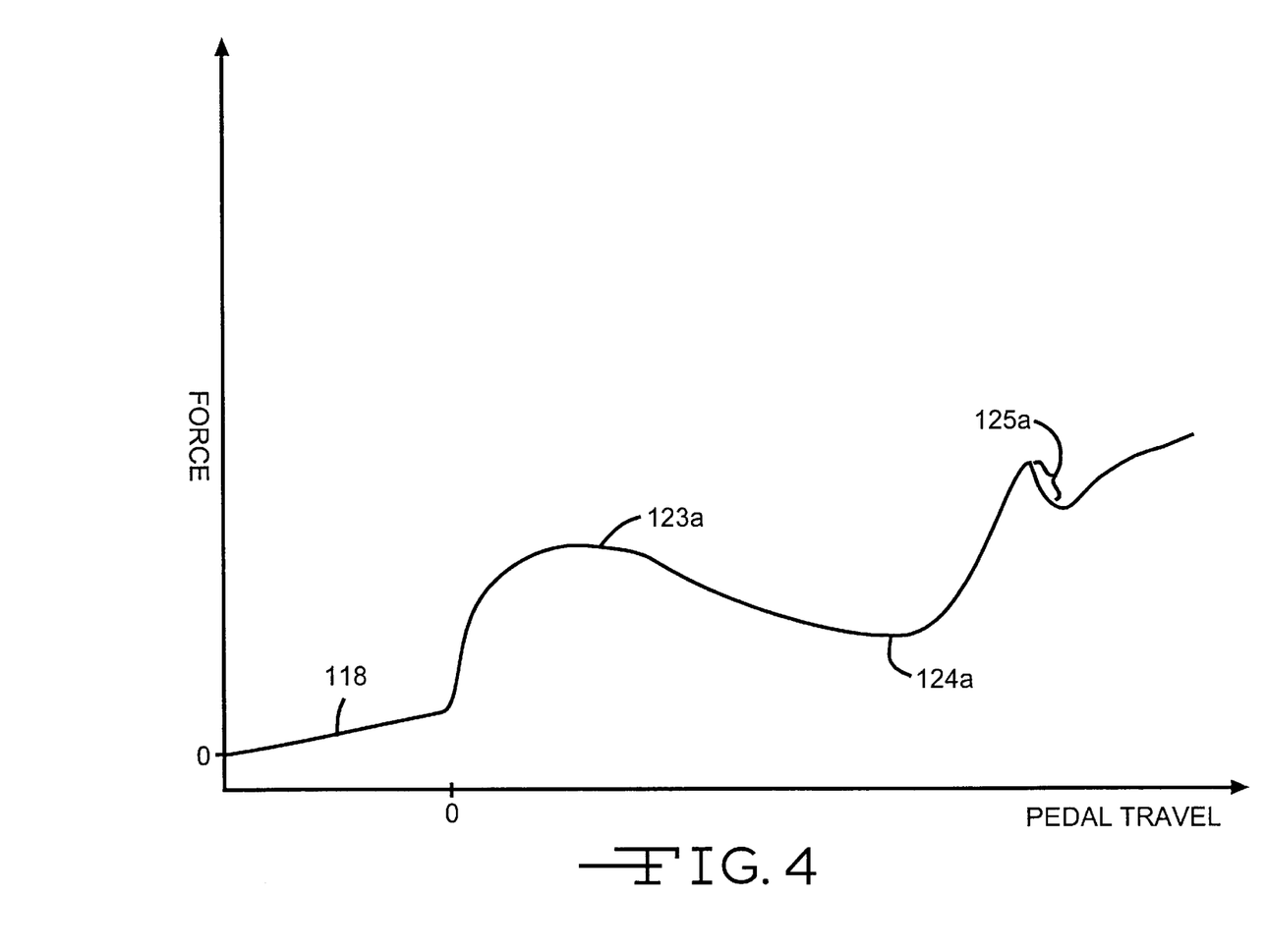
FIG. 4 is a graph of pedal travel versus pedal force when the booster is controlled without the features of the invention.

For the purposes of illustration, the operation of the brake system 10 without the innovative features of the algorithm 100 that are the subject of the present invention will now be described. FIGS. 3 and 4 illustrate the expected response of various parameters of the system 10 to the composite pressure command produced in the summing function 110 as the brake pedal 18 is depressed to an actuated position.

FIG. 3 is a graph of the change in various system parameters with respect to time during the initial travel of the brake pedal 18 toward an applied position during a typical braking event. The motion of the pedal 18 is illustrated by a pedal travel curve 112. The pedal travel curve 112 will be understood to illustrate the variation in the pedal travel signal 102 produced by the pedal position sensor 32 during the braking event. The pedal travel curve 112 starts at a negative value when time equals zero. This is because the brake pedal 18 starts in the fully retracted position, and pedal travel does not equal zero until, at the point in time indicated at 114, the brake pedal 18 has been depressed sufficiently to cause the arm 24 to start to move, as described above. The force $F_{pedal}$ that the driver exerts on the brake pedal 18 is illustrated by a pedal force curve 116. The pedal force curve 116 illustrates the steadily increasing pedal force $F_{pedal}$ exerted by the driver as the brake switch spring 31 is compressed and the brake pedal 18 moves from the fully retracted position to the zero position thereof during the time between zero and the time point 114. This relationship between pedal travel and pedal force is illustrated in FIG. 4 by a pedal travel versus force curve 118. As illustrated in FIG. 4, a relatively linear relationship between the pedal travel and pedal force $F_{pedal}$ exists during movement of the brake pedal 18 from the fully retracted position of the brake pedal 18 (where the force axis crosses the pedal travel axis in FIG. 4) and the zero position of the brake pedal 18.

Once the driver has depressed the brake pedal 18 to the position zero, at the time point 114 of FIG. 3, further movement of the brake pedal 18 in the apply direction is impeded until the driver generates sufficient force to overcome the preload of the springs, such as the spring 65 and the friction of the various seals in the boost piston assembly 16. This is illustrated by a leveling off of the pedal travel curve 112 in FIG. 3, and a steepening of the pedal force curve 116 at the time point 114, and a sharp rise in the pedal travel versus force curve 118 of FIG. 4 at the position zero.

As shown in FIG. 3, at a time point 120, a command signal 121 is turned on. The command signal 121 may be understood to be the composite pressure command produced in the summing function 110. The command signal 121 is preferably blocked until the command signal 121 reaches a certain magnitude to avoid "chattering" or "simmering" of the control valve 37 due to electronic noise in the command signal 121. The value of the command signal 121 initially after being turned on is a value that corresponds to a closed position of the control valve 37. After the command signal 121 is turned on, the command signal 121 begins to rise slowly due to continued movement of the brake pedal 18, and the control valve 37 begins to open. However boost pressure, as shown by a pressure curve 122 in FIG. 3, can be seen to lag the command signal 121 increase initially. This initial lag is due to the relatively low flow rates of hydraulic fluid from the control valve 37 when the control valve 37 is nearly fully shut, and the relatively rapid increase in volume of the boost chamber 63 as the boost piston 54 begins to move.

The pedal force $F_{pedal}$ continues to rise due to the preload in the spring 65, then, with the input piston 50 and the boost piston 54 still in contact, the pedal force $F_{pedal}$ drops starting at a time point 123 because of the boost pressure rising in the boost chamber and acting on the boost piston 54 to assist the driver to compress the spring 65 (indicated at 123a in FIG. 4). The pedal force $F_{pedal}$ continues to drop until the boost pressure in the pedal chamber 62 generates a force $F_{boost\ PC2}$ on the input piston 50 which sufficiently opposes the force $F_{pedal}$ applied by the driver through the brake pedal 18 to the input piston 50 to cause the input piston 50 and the boost piston 54 to separate at a time point 124 in FIG. 3 (the point of pedal separation is indicated at 124a in FIG. 4). The opposition to the pedal force $F_{pedal}$ then rises as the boost pressure in the pedal chamber 62 continues to rise. The driver feels the increasing resistance to movement of the brake pedal 18, causing the pedal movement to hesitate at a period of time indicated at 125 in FIG. 3 (the region of hesitation is illustrated in FIG. 4 at 125a).

The derivative boost pressure command $P_{Kd}$ component of the composite pressure command is reduced as the speed $\dot{\chi}$ of the brake pedal 18 drops during this hesitation. This causes boost pressure to fall in the pedal chamber 62, lowering the force $F_{boost\ PC2}$ acting on the input piston 50, and the pedal 18 begins to move again. As the speed $\dot{\chi}$ of the brake pedal 18 increases, the derivative boost pressure command $P_{Kd}$ increases, the boost pressure in the pedal chamber 62 rises, the force $F_{boost\ PC2}$ rises, and the oscillation repeats, as shown at time points 126 and 128 of FIG. 3. This oscillation results in an irregular pedal travel versus pedal force curve I 18 in FIG. 4 (the oscillations at time points 126 and 128 of FIG. 3 are not shown in FIG. 4, occurring at a pedal travel which is off the scale of the graph of FIG. 4). The irregularity of the pedal travel versus pedal force curve 118 results in poor pedal feel.

A first aspect of the invention is achieving an indication of movement of the brake pedal 18 prior to significant load being developed on the brake pedal 18. As shown in FIG. 1, the pedal travel is measured across the dimension "A". The brake switch spring 31 has a low spring rate, and, as seen in FIG. 4, does not develop significant load on the brake pedal 18 when being compressed during movement of the brake pedal 18 from the fully retracted position to the zero position. In accordance with the invention, the position of the brake pedal 18 is measured by the sensor 32 while the brake pedal is in the region between the fully retracted position and the zero position. This monitoring provides early indication of pedal travel before significant load is developed due to trying to compress the preloaded spring 65 after the brake pedal 18 is depressed past the zero position.

Figure 5:
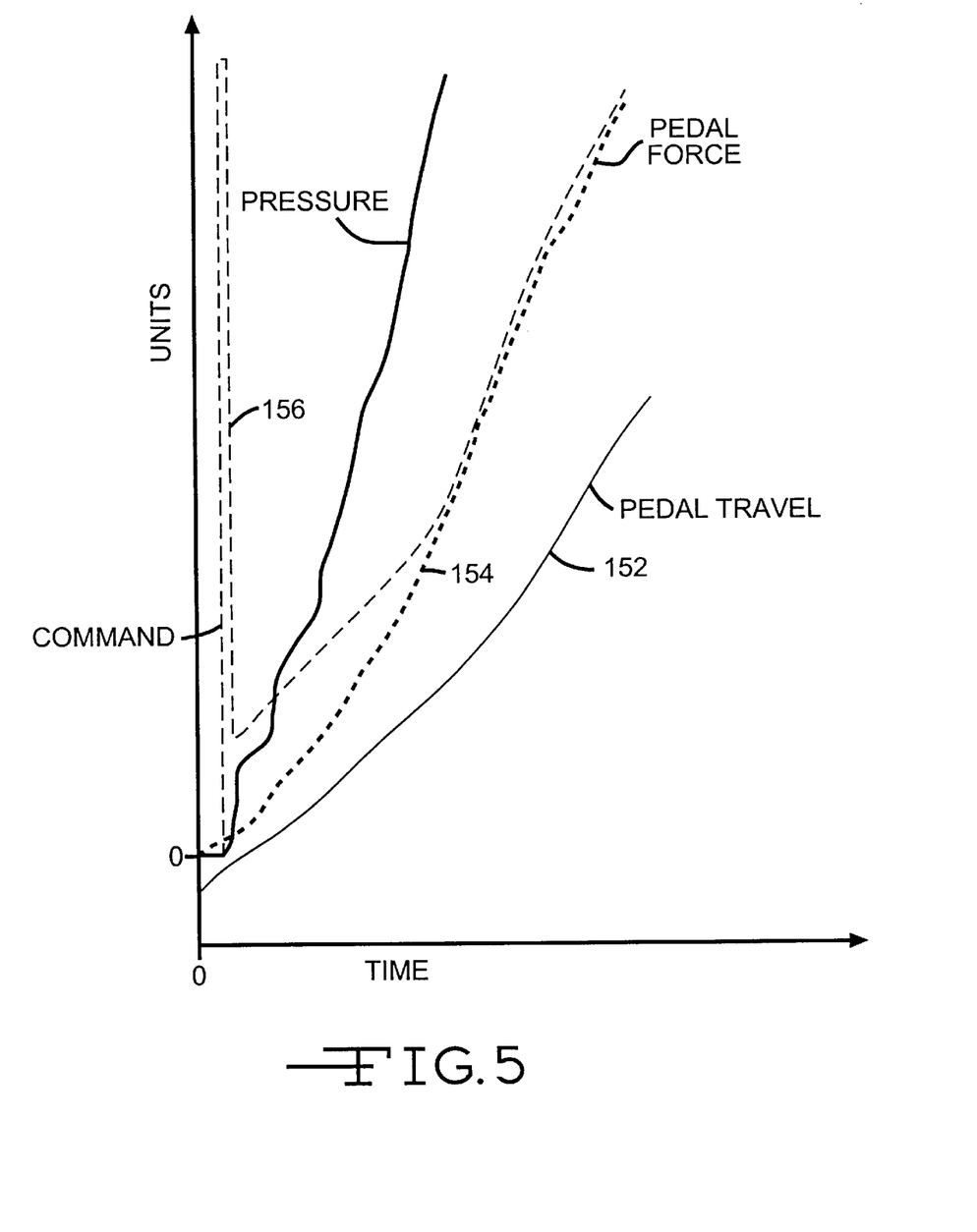
FIG. 5 is similar to FIG. 3, except showing the response when the booster is controlled according to the present invention.

In a second aspect of the invention, the early indication of pedal travel is used to command an increase in boost pressure which is sufficient to overcome the preload force of the spring 65 and the springs in the master cylinder 14, and the friction retarding movement of the input piston 50 and the boost piston 54 caused by the various seals of the hydraulic boost piston assembly 16 and the master cylinder 14. This command in response to the initial movement of the brake pedal 18 is accomplished by an open loop pressure apply function 150 of the algorithm 100, seen in FIG. 2. The open loop pressure apply function 150 is a control mechanism used to increase the initial boost pressure build rate. When movement of the brake pedal 18 from the fully retracted position is detected, open loop pressure apply function overrides the composite pressure command produced in the summing function 110, substituting, for a predetermined period of time, a voltage command signal of predetermined magnitude. This voltage command signal is fed to the pressure control valve 37 as the pressure command signal 103, and causes the pressure control valve 37 to move to a predetermined position. In one embodiment of the invention, the pressure control valve 37 is commanded to move one hundred percent open for about ten milliseconds, as shown in FIG. 5. This voltage command causes the pressure control valve 37 to open. Note that this open loop voltage command is only used for a preset amount of time, therefore, only a desired amount of pressure increase is allowed, the amount of boost pressure increase determined to slightly overcome the spring preload and seal friction discussed above. The appropriate predetermined position and period of time will vary according to the specific characteristics of each brake system 10, and may be empirically derived during pre-production testing. After the predetermined period of time has expired, the open loop pressure apply function 150 ceases to override the composite pressure command produced in the summing function 110. It should be noted that any of several methods well known in the art may be suitably used to accomplish the functions of developing the overriding voltage command and timing the duration of the overriding signal in the open loop pressure apply function 150. It should also be noted that, preferably, the open loop pressure apply function 150 is only invoked when the pedal travel has returned to the fully retracted position, and is then reapplied. Therefore, the open loop pressure apply function 150 only functions once per brake application.

Figure 6:
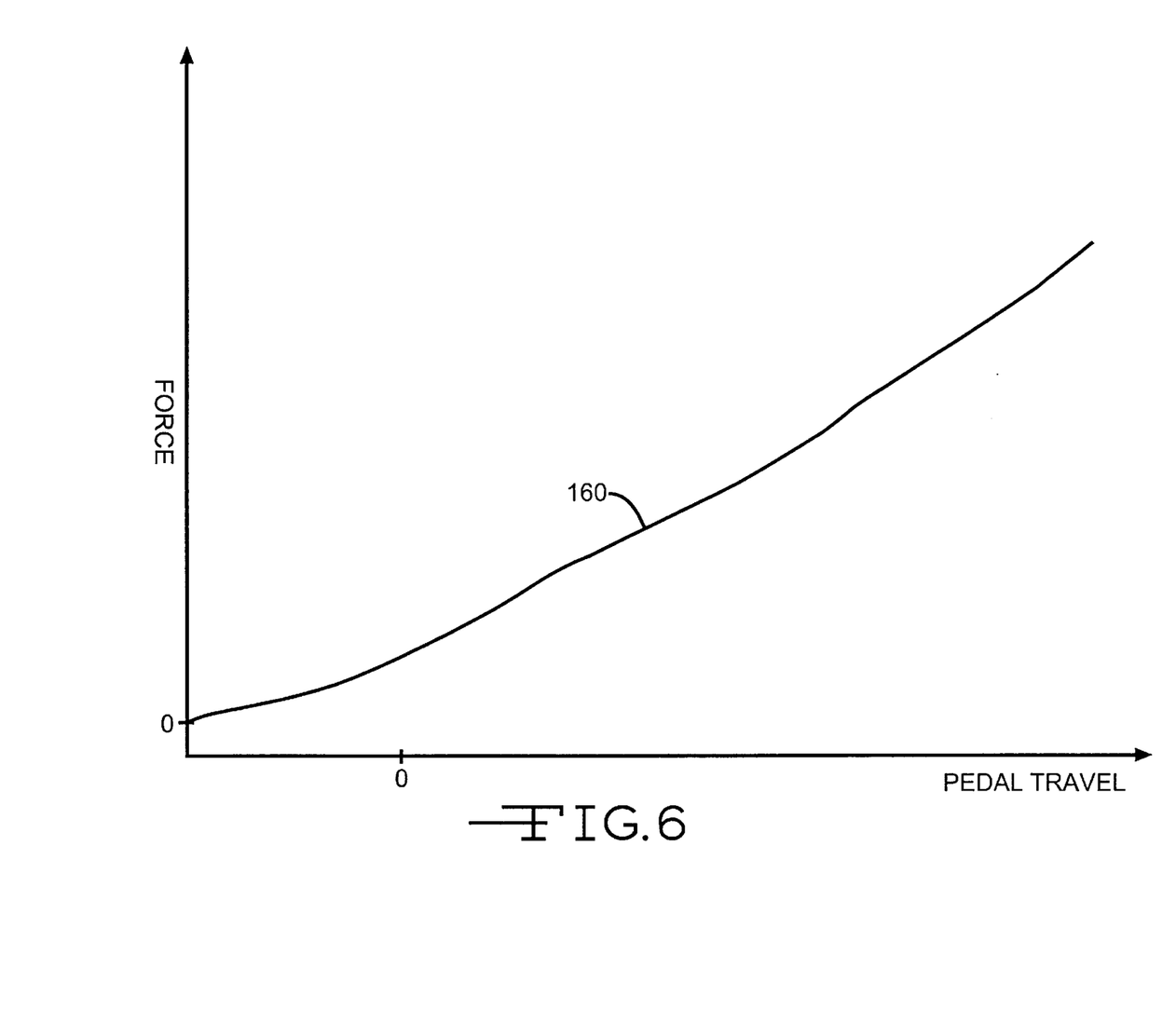
FIG. 6 is similar to FIG. 4, except showing pedal travel versus pedal force when the booster is controlled according to the present invention.

Referring now to FIGS. 5 and 6, the results of the control method of the present invention can be seen in the response of the brake system 10 to a driver brake apply operation similar to, though slightly faster, the brake apply operation illustrated by the graphs of FIGS. 3 and 4. In FIG. 5, a curve 152 illustrates pedal travel with respect to time, while a curve 154 illustrates the pedal force $F_{pedal}$ with respect to time. When time equals zero, the brake pedal 18 begins to be depressed by the driver. A slight rise in pedal force $F_{pedal}$ is illustrated as the brake switch spring 31 is compressed, but no substantial resistance is felt by the driver. As shown by a curve 156, the pressure command signal 103 out of the algorithm 100 takes an almost immediate jump to a value demanding the control valve 37 to go one hundred percent open as the open loop pressure apply function 150 overrides the composite pressure signal supplied to the open loop pressure apply function 150 from the pressure to voltage conversion function 111. After a very short period of time, the open loop pressure apply function 150 ceases to override the composite pressure signal supplied thereto, resulting in a rapid drop in the pressure command signal 103 out of the algorithm 100 to the value of the composite pressure signal out of the pressure to voltage conversion function 111. As shown by a boost pressure curve 158, boost pressure supplied to the hydraulic boost piston assembly 16 by the control valve 37 has been increased to a substantial level by the time the open loop pressure apply function 150 ceases to override the composite pressure signal. Thus, in accordance with the first and second aspects of the invention discussed above, the early motion of the brake pedal 18 from the fully retracted position to the zero position thereof is monitored, and a pressure command pulse is applied to provide an initial rapid rise in the boost pressure. The increased boost pressure assists the driver to achieve a smooth pedal apply by overcoming the preload of the spring 65 and the springs of the master cylinder 14, and the seal friction in the hydraulic boost piston assembly 16 before the driver feels these forces. Thus the rapid rise in pedal force as the driver depresses the brake pedal past the zero position (where the arm 24 starts to move the input piston 50) which was shown in FIGS. 3 and 4 is eliminated, as may be seen in FIG. 5. This is also shown in FIG. 6, where a curve 160 shows the pedal travel versus pedal force (pedal feel) of the brake system 10 when the brake system 10 is operated according to the method of the invention.

Additionally, this increased boost pressure causes the input piston 50 and the boost piston 54 to separate before the driver depresses the brake pedal to the zero position, and before the driver can feel the forces acting on the input piston 50. Thus, the oscillations discussed above with respect to FIGS. 3 and 4, which were initiated by the changing resistance to pedal apply felt by the driver when the input piston 50 and the boost piston 54 separate, are not present The irregularity of the pedal travel versus pedal force curve 118 in FIG. 4 resulted in a poor pedal feel. In contrast, when the brake system 10 is operated with early pedal travel detection, and early pressure boost sufficient to overcome spring preloads, seal friction, and cause piston separation, the pedal travel versus pedal force curve 160 is smooth, as seen in FIG. 6. This results in a good pedal feel.

Figure 7:
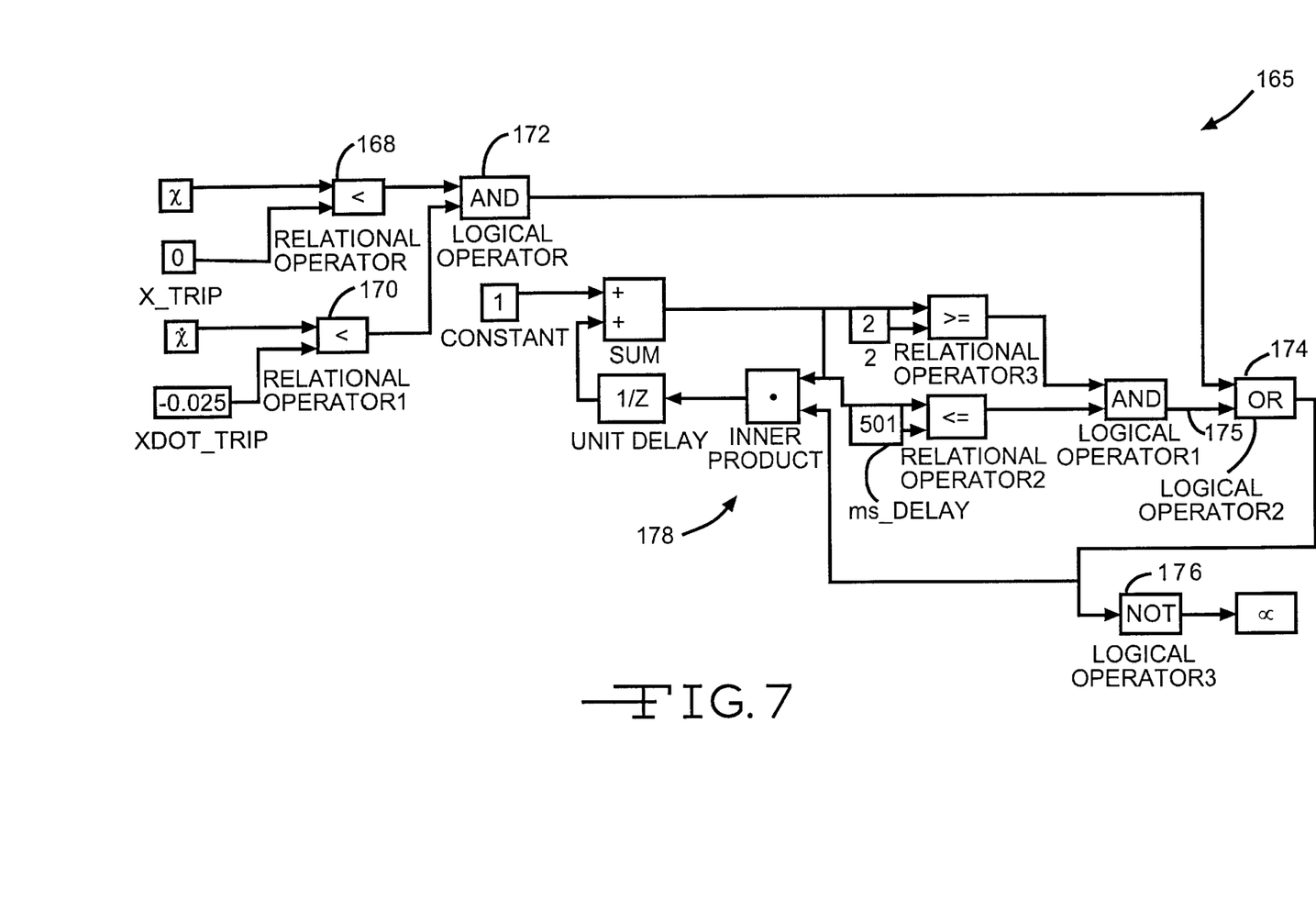
FIG. 7 is a detailed view of a pedal return bounce function of the algorithm illustrated in FIG. 2.

Referring now to FIGS. 2 and 7, another aspect of the invention is shown in a pedal return bounce function 165 of the algorithm 100. In certain situations, such as when a driver slides his or her foot off of the brake pedal to step on the accelerator pedal, the brake pedal 18 is allowed to freely return to the fully retracted position under the force developed by the master cylinder springs, the spring 65 and the force $F_{boost\ PC2}$ developed by the boost pressure in the pedal chamber 62 acting on the input piston 50. In such a situation, when the brake pedal 18 hits the mechanical stop 26, the momentum of the brake pedal 18 generates a rebound reaction that moves the brake pedal 18 in the opposite direction. The pedal movement generated after the rebound can be sufficiently large that a pressure command signal 103 is generated. After a build-up of boost pressure in the pedal chamber 62, the force $F_{boost\_PC2}$ is re-developed, and acting concert with the spring 65, drive the brake pedal 18 against the mechanical stop 26 again, causing a second rebound action. Each time the pressure command signal 103 is generated, unwanted braking occurs as the boost pressure actuates the hydraulic boost piston assembly 16 into operating the master cylinder 14 and thus the brakes 12. Without the damping of the driver's foot on the brake pedal, unstable repetitions of this rebound-induced braking can continue to occur for an extended period. The object of the pedal return bounce function 165 is to recognize the unstable condition of this rebound action before the cycling dynamics begin and to prevent the control valve 37 from exciting the uncontrollable mode.

The inputs of pedal position, $\chi$, and pedal speed $\dot{\chi}$ are used to identify the onset of a pedal oscillation condition. The output of the pedal return bounce is a multiplier gain, $\alpha$, which is two state (i.e., $\alpha$ is either zero or one). The output $\alpha$ of the pedal return bounce function 165 is sent to a multiplier function 166 to be logically multiplied by the composite pressure command signal out of the summing function 110. When $\alpha$ is zero, the signal which is sent to the pressure to voltage conversion function 111 by the multiplier function 166 is zero, and the pressure command signal 103 from the algorithm 100 will be zero. When $\alpha$ is one, the signal which is sent to the pressure to voltage conversion function 111 by the multiplier function 166 is the composite pressure command developed in the summing function 110, and the pressure command signal 103 from the algorithm 100 will be based on the composite pressure command signal 103 as converted to voltage in the pressure to voltage conversion function 111.

A detailed view of the pedal return bounce function 165 is shown in FIG. 7. In a first relational operator 168, the position $\chi$ of the brake pedal 18 is compared to a constant x_trip to determine whether the brake pedal 18 is in the region between the position represented by the constant x_trip and the fully retracted position. In a preferred embodiment, x_trip is set to zero, so that the output of the first relational operator 168 is one if the brake pedal is in the pre-travel region between position zero, where the arm 24 begins to move during brake apply, and the fully retracted position. If the brake pedal is depressed beyond the zero position, the output of the first relational operator 168 is zero.

In a second relational operator 170, the pedal speed $\dot{\chi}$ is compared to a constant xdot_trip. In one preferred embodiment, xdot_trip is set for –0.025. Pedal speed $\dot{\chi}$ is negative when the brake pedal 18 is traveling toward the fully retracted position. If the pedal speed $\dot{\chi}$ is more negative that xdot_trip, the pedal speed $\dot{\chi}$ toward the mechanical stop 26 may be sufficiently great that the brake pedal 18 may rebound, and the output of the second relational operator 170 is one. If the pedal speed $\dot{\chi}$ is not more negative than xdot_trip, the output of the second relational operator 170 is zero.

The output of the first relational operator 168 and the second relational operator 170 are supplied to an AND logical operator 172. If the outputs of both the first relational operator 168 and the second relational operator 170 are both one, the output of the AND logical operator 172 is one; otherwise the output of the AND logical operator 172 is zero. It will be appreciated that when the brake pedal 18 is close to the mechanical stop 26 (between the fully retracted position and the zero position), and traveling toward the mechanical stop 26 with a high rate of speed ($\dot{\chi}$ is less than xdot_trip), the conditions suggest that pedal rebound may occur, and the output of the AND logical operator 172 is made one, and, if other conditions dealing with a timer function discussed below are proper, the output $\alpha$ of the pedal return bounce function 165 is changed to zero, causing the pressure command signal 103 to go to zero.

If the output $\alpha$ of the pedal return bounce function 165 is maintained as zero, the boost pressure cannot excite the unstable rebounding of the brake pedal 18, and the brake pedal 18 will shortly come to rest in the fully retracted position against the mechanical stop 26. Therefore, when a transitions from one to zero, a timing period is initiated such that $\alpha$ is held equal to zero until a fixed time interval has expired. If the potential for a rebounding of the brake pedal 18 still exists when the time interval has expired (as indicated by the AND logical operator 172 having an output of one), then $\alpha$ will remain equal to zero during a second timing period, and so on until the condition for pedal rebound no longer exists.

The output of the AND logical operator 172 is input to an OR logical operator 174. A second input 175 to the OR logical operator 174 is initially a zero. When the AND logical operator 172 is one, the output of the OR logical operator 174 is one. The output of the OR logical operator 174 is fed to a NOT logical operator 176, which inverts the signal from the OR logical operator 174, and output that inverted signal as $\alpha$. Thus, when the OR logical operator 174 outputs a one because the AND logical operator 172 was outputting a one, indicating that a potential for pedal bounce was present, the NOT logical operator 176 outputs $\alpha$ as zero, causing the pressure command signal 103 to go to zero.

The output of the OR logical operator 174 is also fed to a timer indicated generally at 178. Once the OR logical operator 174 has an output of one, the timer 178 maintains the second input 175 during the timing period described above. In the preferred embodiment, the timer 178 is embodied as a loop counter having the structure illustrated in FIG. 7; however, any suitable conventional timing function may be used. When the time delay period expires, the time 178 changes the second input 175 to the OR logical operator 174 to zero. If the output of the AND logical operator 172 is also zero (indicating that the potential for pedal rebound is absent) the output of the OR logical operator 174 is changed to zero, $\alpha$ changes to one, and the multiplier function 166 passes through the composite pressure signal from the summing function 110 to the pressure to voltage conversion function 111. On the other hand, if, when the timing period expires, and the second input 175 is changed to zero, the output of the AND logical operator 172 is one, the output of the OR logical operator 174 remains at one until the out put of the AND logical operator 172 changes to zero. The timer 178 resets when the AND logical operator 172 changes to zero. The length of the timing period of the timer 178 should be chosen to be as short as possible, but long enough to permit the conditions for pedal rebound to clear during the timing period. In this manner, the pedal return bounce function 165 of the algorithm 100 identifies conditions for an unstable and uncontrolled pedal rebound condition, and overrides the boost pressure command 103 for a period of time sufficient to allow the conditions for pedal rebound to be eliminated.

Referring again to FIG. 1, the travel of the brake pedal 18 is measured across the dimension "A" in the embodiment of the hydraulic boost piston assembly 16 shown therein, as described above. However, a sensor could be provided which measures across the dimension "B" if a spring (not shown) with a low spring rate, similar to the brake switch spring 31, were located between the input piston 50 and the boost piston 54. The input shaft 24 could then be connected to the brake pedal 18 with a connection that did not have lost motion. A sensor (not shown) could be packaged within the body of the hydraulic boost piston assembly 16 to sense the movement of the input piston 50 or the shaft 24. An advantage of such an arrangement would be the easy packaging of the position sensor within the body of the hydraulic boost piston assembly 16.

Figure 8:
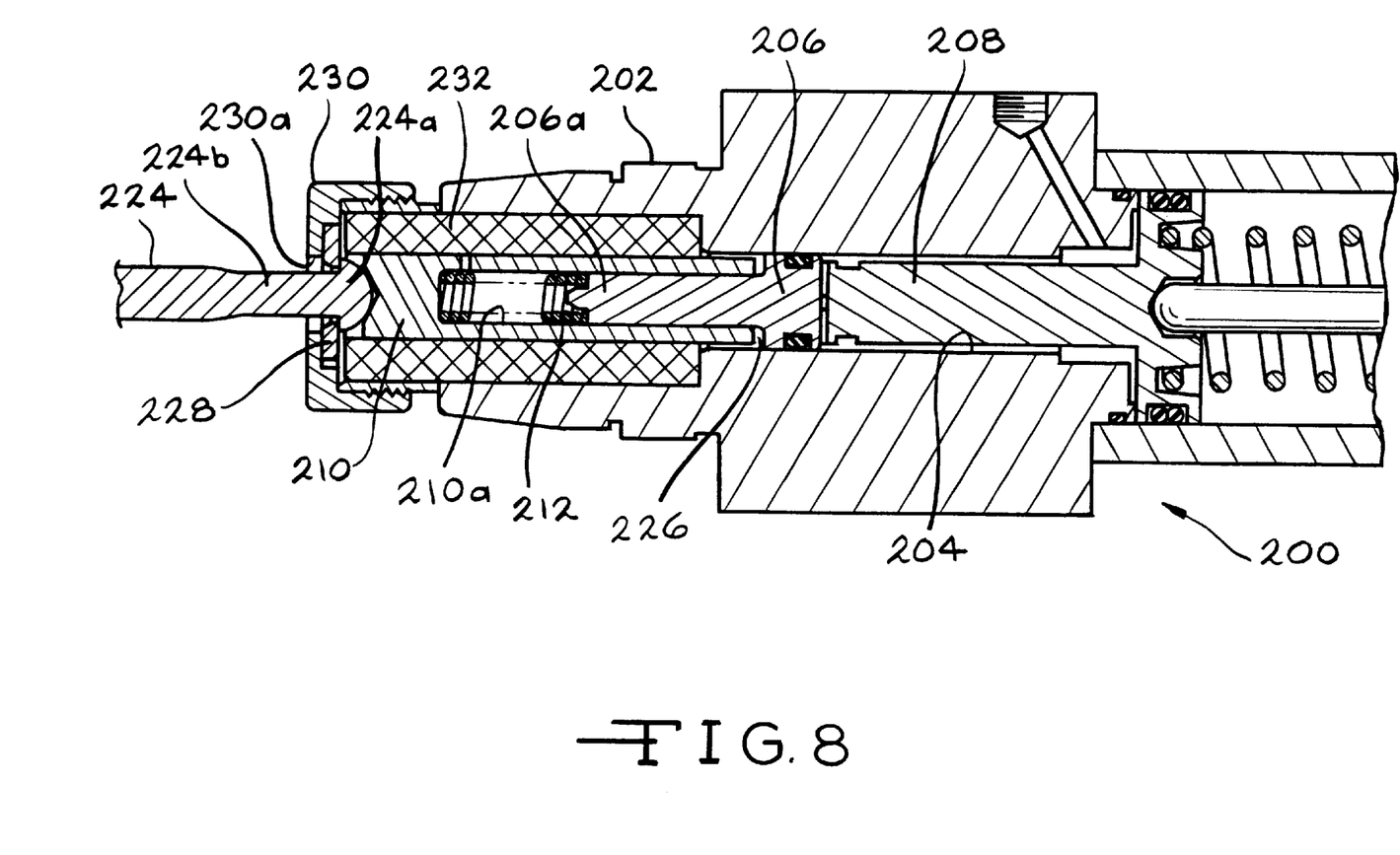
FIG. 8 is a partial side sectional view of an alternate embodiment of a hydraulic boost piston assembly having an internal pedal travel sensor.

Referring now to FIG. 8, there is shown an alternate embodiment of a hydraulic boost piston assembly, indicated generally at 200. The assembly 200 is generally similar in construction and operation to the hydraulic boost piston assembly 16 described above with respect to FIG. 1, with the exception of differences which will now be described.

The assembly 200 has a tubular body 202 that is made up of multiple component parts, similar to the hydraulic boost piston assembly 16. The body 202 defines a stepped bore 204. An input piston 206 and a boost piston 208 are reciprocably disposed in the bore 204, similar to the input piston 50 and boost piston 54 of the hydraulic boost piston assembly 16.

The input piston 206 has a reduced diameter extension 206a extending axially away from the boost piston 208. A cylindrical spring housing 210 is provided which defines a cylindrical recess 210a in one axial face thereof. The spring housing 210 is disposed adjacent the input piston 206 such that the extension 206a of the input piston extends into the recess 210a of the spring housing 210. A spring 212 is captured in the recess 210a so as to be compressible between the spring housing 210 and the axial face of the reduced diameter extension 206a of the input piston 206.

The spring housing 210 has a slight recess in the second axial face thereof, within which an arm 224 is seated. The arm 224 is operatively connected to the brake pedal 18 with a connection that does not have lost motion. Instead, in the assembly 200, lost motion between the brake pedal 18 and the input piston 206 is provided by a gap 226 between the spring housing 210 and the input piston 206. The spring housing 210 and the input piston 206 are urged apart by the spring 212 to establish the gap 226.

The end of the arm 224 engaging the spring housing 210 has an enlarged head 224a joined to the rest of the arm 224 by a reduced diameter neck 224b. The head 224a is captured within the body 202 of the assembly 200 by a U-shaped locking plate 228. The locking plate 228 is fitted around the neck 224b of the arm 224, and engages the head 224a of the arm 224 to prevent movement of the head 224a out of the body 202 of the assembly 200. The locking plate 228 is retained against the body 202 by a threaded annular locking nut 230. The locking nut 230 has a central opening 230a of sufficient diameter to fit over the head 224a of the arm 224, but small enough in diameter to engage the locking plate 228. The locking nut 230 is threaded onto the body 202 of the assembly 200.

A sensor 232 is disposed within a cavity in the body 202 of the assembly 200, and about the spring housing 210. The sensor 232 is retained in the body 202 by the locking nut 230. The sensor 232 develops a signal that is related to the position of the spring housing 210 within the body 202. In operation, the arm 224 remains seated against the spring housing 210, and, since there is no lost motion between the arm 224 and the brake pedal 18, the position of the spring housing 210 within the body 202 is directly related to the position of the brake pedal 18. Thus, the signal developed by the sensor 232 is indicative of the position of the brake pedal 18.

When the driver steps on the brake pedal 18, moving the brake pedal 18 from the fully retracted position thereof, the arm 226 moves the spring housing 210 toward the input piston 206, compressing the spring 212. When the spring 212 is sufficiently compressed to close the gap 226, the spring housing 210 contacts the input piston 206, and the input piston 206 begins to move. For the purposes of this application, the position of the brake pedal 18 at the point at which the spring housing 210 contacts the input piston 206 is the zero position. It will be appreciated that the zero position of the assembly 200 will functionally correspond to the zero position described above with respect to the first embodiment shown in FIG. 1.

The sensor 232 senses the movement of the spring housing 210 while the brake pedal 18 is moving in the region between the fully retracted position and the zero position, and sends a position signal to the control circuit 36 (FIG. 1). It will be appreciated that this monitoring of the brake pedal position in this region enables the open loop pressure apply function 150 and the pedal return bounce function 165 of the algorithm 100 to operate as described above. It will be appreciated that the assembly 200 provides an advantage in packaging the sensor 232 within the body 202 of the assembly 200.

Again referring to FIG. 1, another method of obtaining an early indication of movement of the brake pedal 18 which is contemplated is to use the signal developed by the brake pedal switch 30 as an input to the control circuit 36. In this case, the pedal movement is not measured, but the brake switch 30 is toggled before a preload is established (i.e., before the brake pedal 18 is depressed past the zero position, and before the arm 24 is moved to compress the pre-loaded spring 65).

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A method of controlling the operation of an electrohydraulic brake booster to achieve a desired brake pedal feel, which brake booster is selectively supplied with pressurized hydraulic fluid from a boost pressure control valve, the brake booster having an input piston and a boost piston, the method comprising:
   a. providing a linkage between a brake pedal and the input piston providing lost motion between the brake pedal and the input piston;
   b. sensing movement of one of the brake pedal and the linkage in a brake apply direction during lost motion of the brake pedal to generate a position signal representative of the position of the brake pedal; and
   c. initiating a command pulse to the boost pressure control valve of a predetermined magnitude and a predetermined duration when movement of the brake pedal is sensed during lost motion of the brake pedal to cause the boost pressure control valve to supply hydraulic fluid to the brake booster to raise pressure acting on the boost piston to a desired initial pressure.

2. A method of controlling the operation of an electrohydraulic brake booster to prevent uncontrolled braking of a vehicle due to brake pedal rebound when a brake pedal is suddenly released, the method comprising:

a. providing a sensor for monitoring a brake pedal utilized to actuate the brake booster for conditions conducive to brake pedal rebound of sufficient magnitude to actuate the brake booster to cause uncontrolled braking of the vehicle; and b. blocking operation of the electrohydraulic brake booster for a predetermined time period upon detection of conditions conducive to brake pedal rebound of sufficient magnitude to actuate the brake booster.

3. The method according to claim 2, wherein step a) includes providing a pedal position sensor generating a signal representative of the position of the brake pedal.

4. The method according to claim 3, including, before step b) the steps of determining the speed of the brake pedal, the direction of travel of the brake pedal and the position of the brake pedal relative to a mechanical stop of the brake pedal.

5. The method according to claim 4, wherein operation of the brake booster is blocked according to step b) if the brake pedal is determined to be within a predetermined distance of the mechanical stop of the brake pedal and traveling toward the mechanical stop of the brake pedal with greater than a predetermined speed.

6. An electrohydraulic brake booster for a vehicle brake system, including:

a body defining a stepped bore therein, said bore being defined by said body to have a large diameter portion and a small diameter portion;

a boost piston disposed in said large diameter portion of said bore;

an input piston disposed in said small diameter portion of said bore;

an arm operatively connecting said input piston to a brake pedal with a lost motion connection; and a sensor for sensing one of said arm and said brake pedal, said sensor generating a signal indicative of the position of said brake pedal during lost motion movement of said brake pedal.

7. The brake booster of claim 6, wherein said lost motion connection between said input piston and said brake pedal is provided by a brake switch spring compressibly disposed between said arm and said brake pedal.

8. The brake booster of claim 6, wherein said lost motion connection between said input piston and said brake pedal is provided by a spring compressibly disposed between said arm and said input piston.

9. The brake booster of claim 8, wherein said input piston has a reduced diameter axially extending portion, said spring being a helical coil spring, a portion of said spring being disposed about said reduced diameter portion of said input piston, said arm including an elongate portion connected to said brake pedal, and a spring housing disposed between said elongate portion and said input piston, said spring housing having a first axial face in contact with said elongate portion of said arm, said spring having a recess defined in a second axial face, said spring being disposed in said recess of said spring housing and acting to urge said spring housing and said input piston apart.

10. The brake booster of claim 9, wherein said sensor is disposed in a cavity defined in said body of said brake booster, said sensor sensing movement of said spring housing to develop said signal representative of the position of said brake pedal.

* * * * *